United States Patent
Goddard

(10) Patent No.: US 6,644,357 B2
(45) Date of Patent: Nov. 11, 2003

(54) CORRUGATED PIPE WITH IMPROVED PROFILE STABILITY

(75) Inventor: James B. Goddard, Powell, OH (US)

(73) Assignee: Advanced Drainage Systems, Inc., Hilliard, OH (US)

( * ) Notice: Subject to any disclaimer, the term of this patent is extended or adjusted under 35 U.S.C. 154(b) by 26 days.

(21) Appl. No.: 10/037,187

(22) Filed: Nov. 9, 2001

(65) Prior Publication Data
US 2003/0089411 A1 May 15, 2003

(51) Int. Cl.$^7$ ................................................ F16L 11/11
(52) U.S. Cl. ........................ 138/121; 138/122; 138/173; 138/177
(58) Field of Search ................................. 138/121, 122, 138/173, 177

(56) References Cited

U.S. PATENT DOCUMENTS

| | | | |
|---|---|---|---|
| 3,926,222 A | 12/1975 | Shory et al. ................. | 138/122 |
| 3,929,359 A | 12/1975 | Schmunk et al. ........... | 285/401 |
| 4,082,327 A | 4/1978 | Sting et al. .................. | 285/401 |
| 4,202,568 A | 5/1980 | Strom ......................... | 285/336 |
| 4,487,232 A * | 12/1984 | Kanao ......................... | 138/122 |
| 4,779,651 A | 10/1988 | Hegler et al. ................ | 138/109 |
| 4,915,425 A * | 4/1990 | Hegler et al. ................ | 285/179 |
| 4,969,670 A | 11/1990 | Bonnema et al. ........... | 285/319 |
| 5,053,097 A * | 10/1991 | Johansson et al. .......... | 156/158 |
| 5,071,173 A | 12/1991 | Hegler et al. ................ | 285/399 |
| 5,390,704 A * | 2/1995 | Kanao ......................... | 138/121 |

* cited by examiner

Primary Examiner—Patrick Brinson
(74) Attorney, Agent, or Firm—Kremblas, Foster, Phillips & Pollick

(57) ABSTRACT

A corrugated pipe is provided having a pipe structure of an inner wall having an interior surface and an exterior surface, and an outer wall having corrugations, each of the corrugations having an interior surface and an exterior surface, each corrugation having a crown. The pipe structure has a trough between each corrugation, and each trough has a center-point, with the distance between the center-points of adjacent troughs defining the pitch of the pipe. The pipe structure has at each crown a first distance extending in a straight line from the crown exterior surface to the interior surface of the inner wall, with the distance defining the pitch being a second distance, with the ratio of the first distance to the second distance being less than 0.8:1.0. The pipe could be of metal or plastic, but if plastic, upon the application of pressure the pipe can deflect to greater than 30% of its original diameter without exhibiting imperfections of structural failure, and in the preferred embodiment greater than 35%. The outer wall has a sidewall portion intermediate the crown and the trough, with the sidewall portion being inclined to the inner wall in the range of 75–80%, with the angle of inclination in the preferred embodiment being about 78½%.

16 Claims, 2 Drawing Sheets

CORRUGATED PIPE WITH IMPROVED PROFILE STABILITY

FIELD OF THE INVENTION

The present invention relates generally to pipe, and more particularly, to a corrugated plastic pipe or corrugated metal pipe which is formed having improved overall profile stability.

BACKGROUND OF THE INVENTION

This invention is directed to the providing of corrugated pipe, and more particularly to the providing of corrugated pipe of the type used in the drainage of soil and transportation of surface water by gravity for agricultural, residential, civil construction, or recreational purposes. In these particular markets, concrete, steel or clay pipe was traditionally utilized. In practice, the drainage pipe was installed through the placing together of relatively short sections of the pipe to construct the desired drainage system. Such sections or pieces could range from a few feet to more than a couple of dozen feet.

Consequently, construction was extremely time consuming and relatively expensive because of the number of pieces and total weight associated with the components of the drainage system. Additionally, the relatively large number of pipes which were required to be installed for such systems necessitated proper positioning of an extremely large numbers of pipe in order to insure minimal leakage.

Corrugated metal pipe was first developed in the late 1800's utilizing a simple sinusoidal shape. More recent designs have used a box shape corrugation, which is known to be unstable and which imparts very high strain in the outer wall of the corrugation during manufacturing processes. This reduces the effective strength and the tolerance to deflection of this product.

More recently, plastic began to be used as a construction material for drainage pipe. Originally, sections of the plastic pipe or tubing were provided in predetermined lengths or sections which then were interconnected by using separate couplers or coupling units. It was found that corrugated pipe possessed a more desirable structural integrity than regular smooth-walled pipe. The corrugated pipe which currently exists typically has a profile in which the sides are fairly steep and the top or crest is fairly flat. In a typical plastic corrugated pipe, the ratio of the height of a corrugation to the width of an entire corrugation, which latter dimension is also referred to as the pitch, is approximately 0.9:1.0.

Several patents disclose corrugated plastic pipe representative of the prior art. Examples of patents disclosing plastic corrugated pipe include Hegler, Pat. No. 5,071,173; Hegler, U.S. Pat. No. 4,779,651; Shroy et al, U.S. Pat. No. 3,926,222; Schmunk et al, U.S. Pat. No. 3,929,359; Bonnema et al, U.S. Pat. No. 4,969,670; Ström, U.S. Pat. No. 4,202,568; and Sting et al, U.S. Pat. No. 4,082,327. These plastic corrugated pipe patents represent inventions associated with four well-known plastic pipe companies around the world. Each patent discloses pipe having the general profile discussed above, namely, corrugations with relatively steep sides and fairly flat tops.

Tests have been developed by the American Society of Testing & Materials (ASTM) and the American Association of State Highway and Transportation Officials (AASHTO) to evaluate, for example, the performance of corrugated plastic pipe designed for use in hydraulic applications. In one such stiffness test, a pipe must possess a certain minimum stiffness in order to pass. This test is conducted by applying a load at a prescribed rate to a section of the pipe to determine the stiffness per unit length of pipe at 5% deflection. Currently, if the load at 5% deflection is less than the specified minimum, then the pipe fails this test requirement.

Another important deflection criteria seeks to determine the amount of deflection the pipe can withstand without wall buckling, cracking, encountering what is known in the trade as dimpling, or loss of ability to carry increased load. In order to pass this test, the pipe must be able to withstand substantial deflection without any of the aforementioned failures occurring. Currently, in order to pass the test requirement, the pipe must be able to deflect 20% of its original diameter.

While both tests are important, with current designs the second is more difficult to pass than the first. To aid in the strengthening of the pipe and to reduce local buckling in the corrugation crown during deflection testing, some manufacturers of plastic pipe have put ridges along the top surfaces of the corrugations. These additional ridges tend to improve the tendency toward local buckling in the crown of this particular type of pipe, but they do not improve the global buckling limits and can actually increase the local bending stresses and strains leading to localized cracking. Hegler et al, U.S. Pat. No. 5,071,173 and Hegler et al, U.S. Pat. No. 4,779,651 both disclose pipe having such an additional corrugation present on the crest.

However, concerns about the strength of corrugated pipe still exist, especially if the pipe is made of plastic. Many current corrugation or wall profile designs tend to be focused on increasing the effective moment of inertia of the pipe wall (increasing the pipe stiffness while limiting or reducing the pipe weight per unit length) with little attention paid to the stability of the wall design. This has resulted in the development of pipe capable of passing the prescribed stiffness tests in the laboratory, but which exhibit dimensional instability when installed in the ground. This dimensional instability can lead to premature failure or excessive deflection. Furthermore, existing pipe profiles do not permit deflection significantly above the current performance requirement of 20%.

A recently developed lab test, which tests the wall section in bending and compression simultaneously, has shown the profile type designed in accordance to this methodology to be substantially more stable than current designs. In bending, one measure of the stability of the pipe wall is the reduction of wall thickness. Wall sections representing this design approach is reduced in thickness approximately 20% of comparable current design.

It is thus apparent that the need exists for an improved corrugated pipe which provides for improved overall profile structural stability, and thus improved in-service performance.

SUMMARY OF THE INVENTION

In accordance with this invention a double-walled corrugated pipe is provided having a pipe structure having an inner wall having an interior surface and an exterior surface, and an outer wall having corrugations. Each of the corrugations has an interior surface and an exterior surface, and each corrugation has a crown. The pipe structure has a trough between each corrugation, each trough having a center-point, with the distance between the center-points of adjacent troughs defining the pitch of the pipe. The pipe structure having at each crown a first distance extending in a straight line from the crown exterior surface to the interior surface of the inner wall, with the distance defining the pitch being a second distance, and with the ratio of the first distance to the second distance being less than 0.8:1.0.

In the preferred embodiment of the invention, the ratio of the first distance to the second distance is about 0.75:1.0. Furthermore, the pipe could be plastic or metal, but if plastic, the pipe upon the application of pressure can deflect to greater than 30% of its original diameter without exhibiting imperfections of structural failure, with this number exceeding 35% in the preferred embodiment of the invention.

The outer wall has a sidewall portion intermediate the crown and the trough, with the sidewall portion being inclined to the inner wall in the range of 75–80°, and with the sidewall being inclined to the inner wall in the preferred embodiment of the invention about 78½°. The inner wall is smooth.

There is also disclosed a double-walled corrugated pipe having a pipe structure, with the pipe structure comprising a smooth inner wall having an interior surface and an exterior surface, and an outer wall having corrugations, with each of the corrugations having an interior surface and an exterior surface. Each corrugation has a crown, and each crown has a center-point. There are troughs between each corrugation, with each trough having a center-point, and with the distance between the center-points of adjacent troughs defining the pitch of the pipe.

The pipe has at each crown center-point a first distance extending from the exterior surface to the interior surface of the inner wall, with the distance defining the pitch being a second distance, with the ratio of the first distance to the second distance being about 0.75:1.0, with the pipe upon the application of pressure deflecting to greater than 30% of its original diameter without exhibiting imperfections of structural failure, and with the outer wall having a sidewall portion intermediate the crown and the trough, and with the sidewall portion being inclined to the inner wall in the range of 75–80°.

The pipe could be of metal or plastic, and if plastic, the structure in its preferred embodiment upon the application of pressure deflects to greater than 35% of its original diameter without exhibiting imperfections of structural failure. Also in the preferred embodiment of the invention, the sidewall portion is inclined to the inner wall about 78½°.

There is also disclosed a double-walled corrugated pipe having a pipe structure having a smooth inner wall having an interior surface and an exterior surface, and an outer wall having corrugations, with each of the corrugations having an interior surface and an exterior surface, and with each corrugation having a crown, with each crown having a center-point. The pipe has troughs between each corrugation, with each trough having a center-point, and with the distance between the center-points of adjacent troughs defining the pitch of the pipe.

The pipe has at each crown center-point a first distance extending from the exterior surface to the interior surface of the inner wall, with the distance defining the pitch being a second distance, and with the ratio of the first distance to the second distance being about 0.75:1.0. The pipe could be of metal or plastic, and if plastic, the pipe upon the application of pressure deflects to greater than 35% of its original diameter without exhibiting imperfections of structural failure, and with the outer wall having a sidewall portion intermediate the crown and the trough, with the sidewall portion being inclined to the inner wall about 78½°.

The primary objective of this invention is to provide a corrugated pipe with improved overall profile stability which is of relatively economical construction and is particularly easy to fabricate.

Another object of this invention is to provide a corrugated plastic pipe with improved overall profile stability which is of relatively economical construction and is particularly easy to fabricate.

Other objects and advantages of the invention will be apparent from the following description, the accompanying drawings, and the appended claims.

DETAILED DESCRIPTION OF THE DRAWINGS

Figure 1:
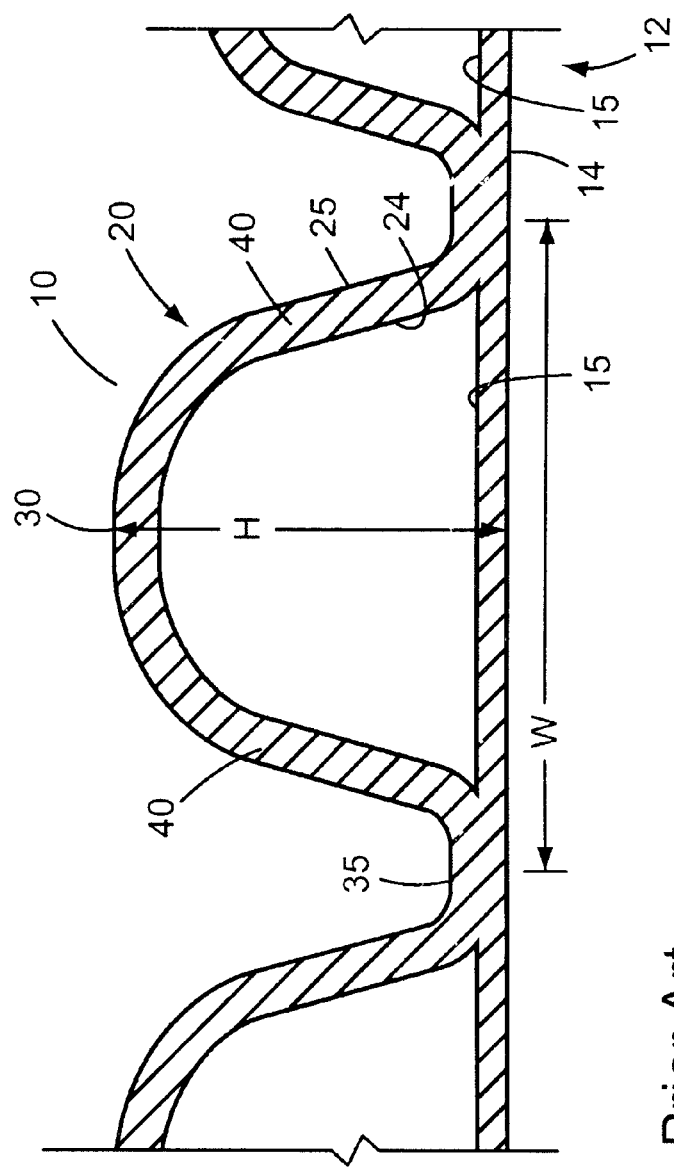
FIG. 1 is a vertical cross section on a greatly enlarged scale of a sidewall section of one type of prior art double-wall corrugated pipe.

Having reference to the drawings, attention is directed first to FIG. 1 which discloses a corrugated pipe designated generally by the numeral 10, which pipe has been made in accordance with the prior art. It can be appreciated that pipe 10 is formed having an inner wall 12, with inner wall 12 having an interior surface 14 and an exterior surface 15. The type of pipe shown is known as a double-wall pipe and inner wall 12 is typically smooth.

Also part of the double-wall pipe 10 is outer wall 20. This wall too has an interior surface 24 and an exterior surface 25. With respect to both inner wall 12 and outer wall 20, the terms "interior" and "exterior" are relative to the center longitudinal axis of the pipe structure itself, which longitudinal axis is not shown.

Figure 2:
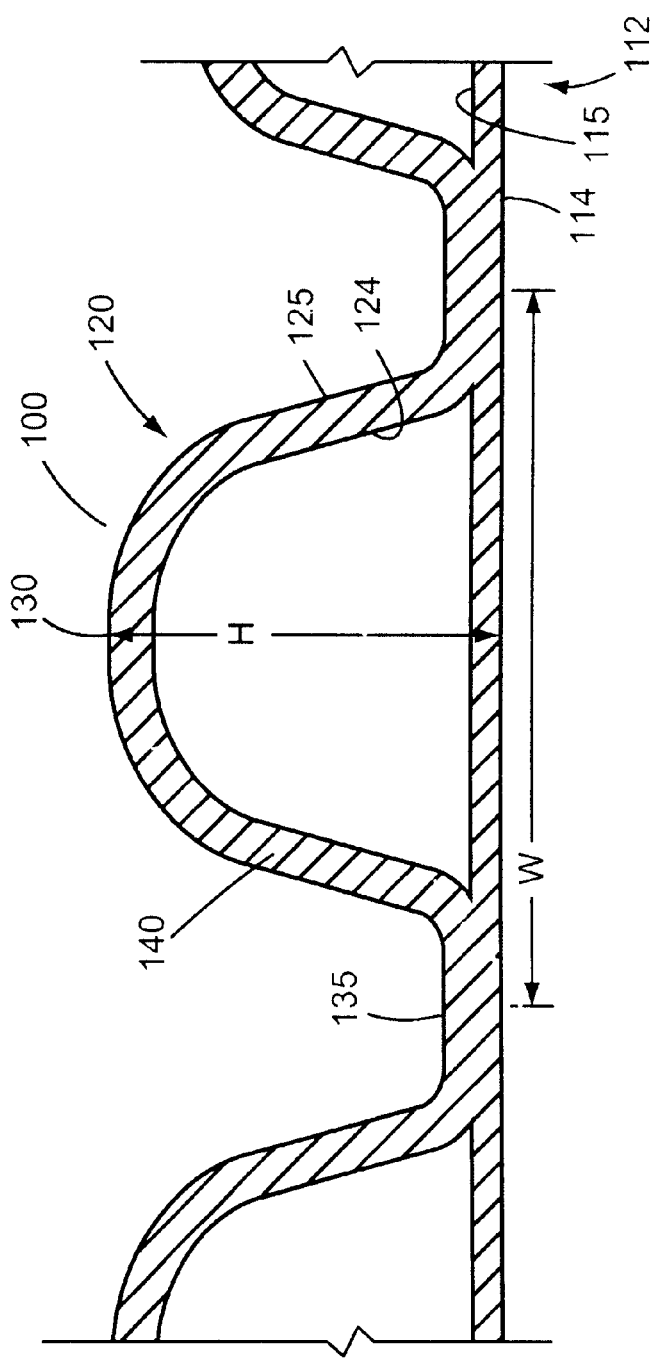
FIG. 2 is a vertical cross section on a greatly enlarged scale of a sidewall section of double-wall corrugated pipe made in accordance with the present invention.

The corrugated outer wall 20 has associated with each corrugation a crown 30. It will be appreciated by a comparison of FIGS. 1 and 2 that the top of the corrugation in FIG. 1 is relatively flat. Helping to define each corrugation are troughs 35, with a trough 35 typically located on each side of the corrugation itself. Intermediate the crown or crest 30 and trough 35 is corrugation side wall 40.

A first distance, "H", is defined as being between the center-point of the crown of the corrugation on the exterior surface thereof, and the point on the interior surface 14 of inner wall 12 beneath the crown's center-point. A second distance, "W", is defined as being the distance between the center-point associated with each trough 35, which distance also is known as the pitch or repeat. As has been stated above, it is common to find the ratio of H:W as being close to or approximating 0.09:1.0. Using the pipe structure associated with the prior art has allowed plastic pipe, for example, subjected to a deflection test to achieve deflections on the order of 20% before buckling or otherwise encountering an imperfection as to failing. Such imperfections in addition to buckling include cracking and dimpling.

Somewhat unexpectedly it was discovered that surprising results could be obtained through what at first glance appears to be merely a minor modification in the cross section associated with corrugated pipe structure. Accordingly, a corrugated pipe designated by the numeral 100 discloses this particular invention. As in the case of the prior art, the pipe 100 of this invention has an inner wall 112, with this inner wall having both an interior surface 114 and an exterior surface 115. Additionally, the corrugated pipe has an outer wall 120, which outer wall 120 has an interior surface 124 and an exterior surface 125. Furthermore, the pipe structure of the present invention also has a crown 130 associated with the pipe corrugation, as well as troughs 35 located on either side of each corrugation. Finally, the pipe structure of this invention has a corrugation side wall 140.

The pipe structure made in accordance with this invention also has a first distance "H" which corresponds to the distance discussed above, as well as a second distance "W" which also corresponds to the distance discussed above with respect to the prior art. However, a significant departure from the prior art can be appreciated when it is realized that the H:W ratio associated with the pipe structure of this invention is less than 0.8:1.0, and, in fact, in the preferred embodiment of the invention is about 0.75:1.0. Additionally, the total height of the corrugation does not exceed a predetermined ratio of the diameter of the pipe.

Another difference between the pipe structure of the invention and the prior art is that the corrugation side walls 140 are angled with respect to the inner wall 12 an angle in the range of between 10–15° to vertical, with the angle in the preferred embodiment of the invention being 12½°. As a result, the corrugation crown associated with this invention is of a much more uniform curve. Additionally, the curved crown associated with the invention must be of a sufficient radius to transition to the side wall in a much smoother curve, tangential to the sidewalls, than those associated with the prior art. Consequently, the crown associated with this invention is more rounded, relatively speaking, in comparison with the relatively flat, upper-most surface of the corrugations of the prior art, so that there are not sharp angles or corners associated with the point of transition. Further, the high bending moments and stiffness associated with the transition from the crown to the sidewall (in a sharp corner) are minimized. With respect to the corrugation pitch, the corrugation itself should be the dominant length of the corrugation and the corrugation inside valley should be a minimum length, preferably less than 1". The corrugation centroid is kept as far above the inside wall as practical, with the corrugation wall being maintained at an approximately uniform thickness.

As a result of the characteristics of the pipe structure of the invention, a corrugated pipe is formed having improved overall profile stability. The degree of improved overall profile stability is accentuated if the pipe is fabricated from plastic. For example, deflection tests have enabled plastic pipes made in accordance with this pipe structure to always achieve greater than 30%, consistently over 35%, and sometimes over 40' deflection before encountering imperfections as to failing.

Furthermore, tests conducted on 42" diameter double wall pipe made in accordance with the pipe profile of this invention have achieved results comparable to those with steel, as to the effective moment of inertia of the pipe wall and the resultant pipe stiffness. Also, tests unexpectedly disclosed that pipe made in accordance with the invention stabilizes much more rapidly following loading tests than was predicted. Still further, with respect to the time affects on this design when the pipe is subjected to strain, actual tests surprisingly disclosed results contrary to the prior depiction of less than desirable test results. Furthermore, in loading tests conducted in a soil medium, under very high soil pressures, pipe manufactured with this proposed design will carry approximately twice the soil load as pipe currently manufactured.

In actual use, the structure is formed by extruding both the outer wall and inner wall together. As has been stated above, the pipe of this invention upon the application of pressure deflects to greater than 30% of its original diameter without exhibiting imperfections of structural failure.

While the form of apparatus herein described constitutes a preferred embodiment of this invention, it is to be understood that the invention is not limited to this precise form of apparatus and that changes may be made therein without departing from the scope of the invention which is defined in the appended claims. For example, pipe made in accordance with this invention could be corrugated inside, and not have a smooth inside liner.

What is claimed is:

1. A double-walled corrugated pipe having a pipe structure comprising an inner wall having an interior surface and an exterior surface, and an outer wall having corrugations, each of said corrugations having an interior surface and an exterior surface, each corrugation having a crown, said pipe structure having a trough between each corrugation, each trough having a center-point, with the distance between the center-points of adjacent troughs defining the pitch of the pipe, said pipe structure having at each crown a first distance, said first distance extending in a straight line from said crown exterior surface to said interior surface of said inner wall, said distance defining said pitch being a second distance, the ratio of said first distance to said second distance being less than 0.8:1.0, said pipe upon the application of pressure can deflect to greater than 30% of its original diameter without exhibiting imperfections of structural failure.

2. The pipe structure according to claim 1 wherein said ratio of said first distance to said second distance is about 0.75:1.0.

3. The pipe structure according to claim 1 wherein said pipe upon the application of pressure can deflect to greater than 35% of its original diameter without exhibiting imperfections of structural failure.

4. The pipe structure according to claim 1 wherein said outer wall has a sidewall portion intermediate said crown and said trough, said sidewall portion being inclined to said inner wall in the range of 75–80°.

5. The pipe structure according to claim 4 wherein said sidewall portion is inclined to said inner wall about 78½°.

6. The pipe structure according to claim 1 wherein said inner wall is smooth.

7. The pipe structure according to claim 1 wherein said pipe is fabricated of plastic.

8. The pipe structure according to claim 1 wherein said pipe is fabricated of metal.

9. A double-walled corrugated pipe having a pipe structure comprising a smooth inner wall having an interior surface and an exterior surface, and an outer wall having corrugations, each of said corrugations having an interior surface and an exterior surface, each corrugation having a crown, each crown having a center-point, said pipe having troughs between each corrugation, each trough having a center-point, with the distance between the center-points of adjacent troughs defining the pitch of the pipe, said pipe having at each crown center-point a first distance extending from said exterior surface to said interior surface of said inner wall, said distance defining said pitch being a second distance, the ratio of said first distance to said second distance being about 0.75:1.0, said pipe upon the application of pressure deflecting to greater than 30% of its original diameter without exhibiting imperfections of structural failure, and said outer wall having a sidewall portion intermediate said crown and said trough, said sidewall portion being inclined to said inner wall in the range of 75–80°.

10. The pipe structure according to claim 9 wherein said pipe is fabricated of plastic.

11. The pipe structure according to claim 9 wherein said pipe upon the application of pressure deflects to greater than 35% of its original diameter without exhibiting imperfections of structural failure.

12. The pipe structure according to claim 9 wherein said sidewall portion is inclined to said inner wall about 78½°.

13. The pipe structure according to claim 9 wherein said pipe is fabricated of metal.

14. A double-walled corrugated pipe having a pipe structure comprising a smooth inner wall having an interior surface and an exterior surface, and an outer wall having corrugations, each of said corrugations having an interior surface and an exterior surface, each corrugation having a crown, each crown having a center-point, said pipe having troughs between each corrugation, each trough having a center-point, with the distance between the center-points of adjacent troughs defining the pitch of the pipe, said pipe having at each crown center-point a first distance extending from said exterior surface to said interior surface of said inner wall, said distance defining said pitch being a second distance, the ratio of said first distance to said second distance being about 0.75:1.0, said pipe upon the application of pressure deflecting to greater than 35% of its original diameter without exhibiting imperfections of structural failure, and said outer wall having a sidewall portion intermediate said crown and said trough, said sidewall portion being inclined to said inner wall about 78½°.

15. The pipe structure according to claim 14 wherein said pipe is fabricated of metal.

16. The pipe structure according to claim 14 wherein said pipe is fabricated of plastic.

* * * * *